Figure 1:
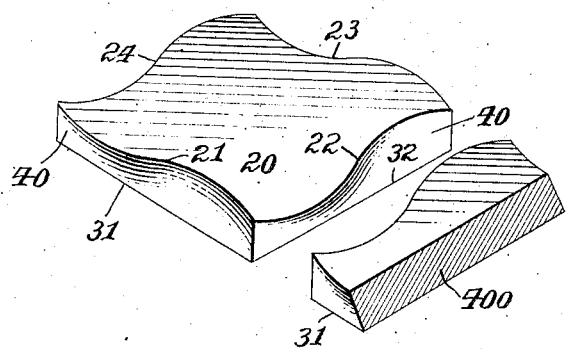

No. 888,530.  
PATENTED MAY 26, 1908.  
J. H. PUGH.  
TILE.  
APPLICATION FILED JAN. 23, 1906.

3 SHEETS—SHEET 1.

Attest:  
May Hughes  
Alan McDonnell

John H. Pugh, Inventor  
by William R. Baird  
His Atty.

No. 888,530.  PATENTED MAY 26, 1908.
J. H. PUGH.
TILE.
APPLICATION FILED JAN. 23, 1906.
3 SHEETS—SHEET 2.
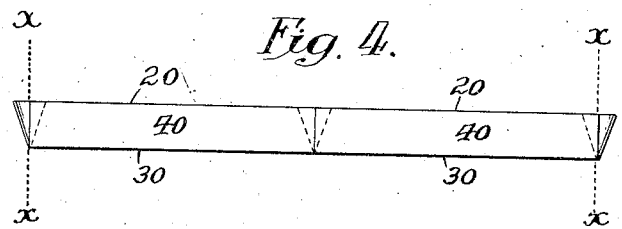
Fig. 4.
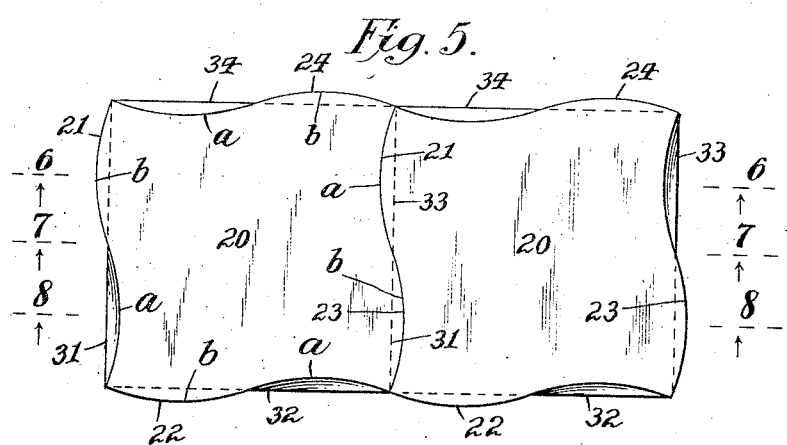
Fig. 5.
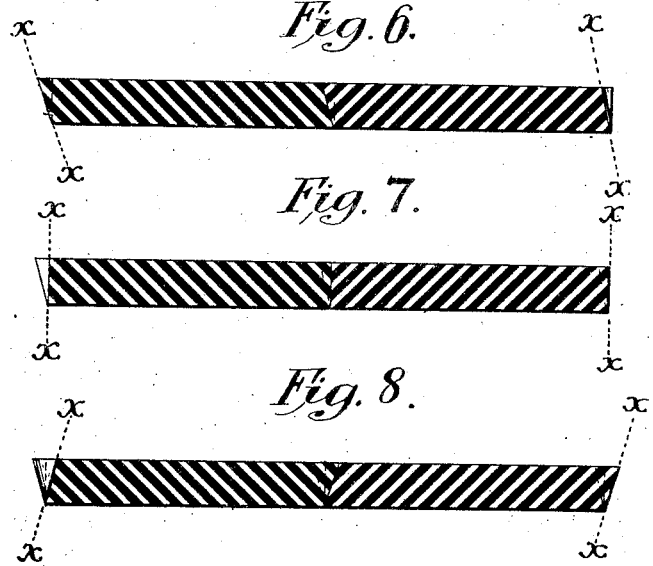
Fig. 6.
Fig. 7.
Fig. 8.
Attest:
May Hughes
Alan McDonnell.
John H. Pugh, Inventor:
by William R. Baird
His Atty No. 888,530. PATENTED MAY 26, 1908.
J. H. PUGH.
TILE.
APPLICATION FILED JAN. 23, 1906.

3 SHEETS—SHEET 3.

Attest:

May Hughes
Alan McDonnell.

John H. Pugh Inventor:
by William R. Baird
His Atty.

UNITED STATES PATENT OFFICE.

JOHN H. PUGH, OF NEW YORK, N. Y.

TILE.

No. 888,530.

Specification of Letters Patent.

Patented May 26, 1908.

Application filed January 23, 1906. Serial No. 297,415.

*To all whom it may concern:*

Be it known that I, JOHN H. PUGH, a citizen of the United States, residing at New York, in the county of New York and State of New York, have invented certain new and useful Improvements in Tiles, of which the following is a specification.

My invention relates to tiles for floors and the like and its novelty consists in the construction and adaptation of the parts, as will be more fully hereinafter pointed out.

Heretofore in the manufacture of tiles and especially of tiles made of rubber, while there has been little difficulty in making tiles of pleasing shapes and interchangeable forms with a strong horizontal bond, there has been difficulty in making tiles having a suitable vertical bond. The result has been that such tiles were secured to the floor or to each other with cement. In spite of this method, such tiles constantly worked loose and caused not only unsightly gaps in the floor design, but also made an open recess which caused persons walking over the tiled surface to trip or fall.

By means of my invention there is provided a simple form of tile having a vertical as well as a horizontal bond and one which is capable of arrangement into an infinite number of artistic designs.

The principle upon which my tiles are constructed is primarily to make them of plane surfaces, top and bottom, and with edges or butt walls of warped surfaces which, along any one edge shall project outwardly and recede inwardly from a surface coincident with the outline of the base but which is at right angles to both the top and bottom surfaces of the tile. The warped surfaces are formed by sweeping a line along the boundary lines of the top and bottom surfaces of the tile and always in a plane perpendicular to such top and bottom surfaces. Making such warped surfaces in adjacent tiles exactly the reverse one of the other, a complete contact and registration is secured between them and making one half of any butt wall exactly the reverse of its other half enables the tiles to be used interchangeably with great ease and economy. The vertical bond between adjacent tiles is efficient and no cement need be employed in laying them.

Figure 2:
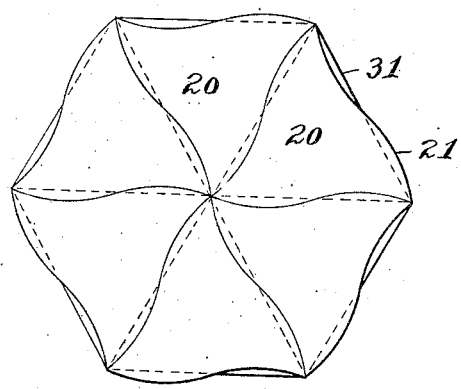
Figure 3:
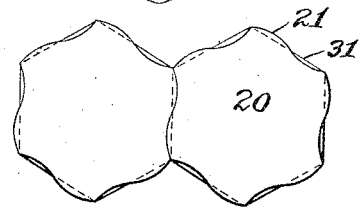
Figure 9:
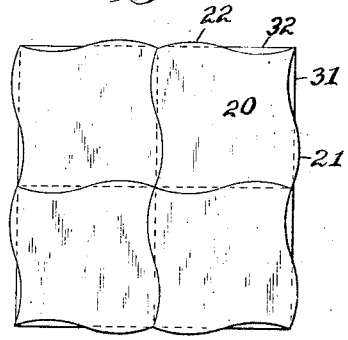
Figure 10:
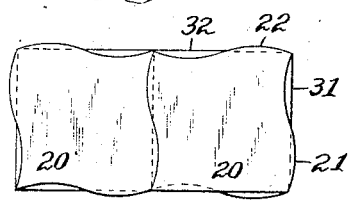
Figure 11:
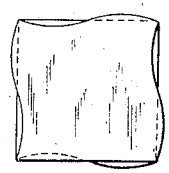
Figure 12:
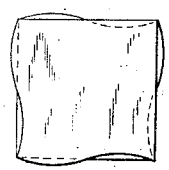
Figure 13:
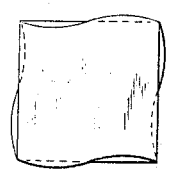
Figure 14:
Figure 15:
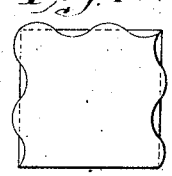
Figure 16:
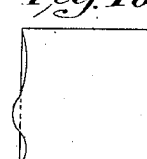
Figure 18:
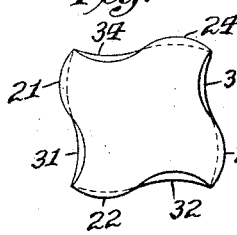
Figure 17:
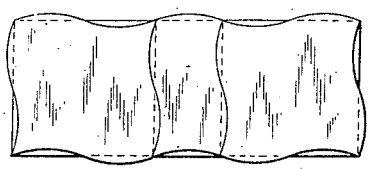
Figure 19:
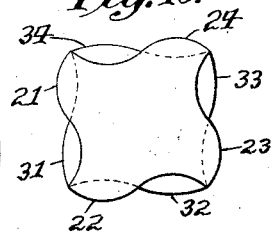

In the drawings, Figure 1 is a perspective view of two of my tiles near each other, one having a plane edge; Fig. 2 is a top plan view of a number of tiles assembled, each tile having a substantially triangular outline; Fig. 3 is a top plan view of two tiles having a substantially hexagonal outline; Fig. 4 is a front elevation; Fig. 5 is a top plan view, and Figs. 6, 7 and 8 are vertical sections (on the planes of the lines 6—6, 7—7 and 8—8 in Fig. 5) of two contiguous tiles of a preferred form; Figs. 9, 10, 11, 12, 13, 14, 15, 16 and 17 are top plan views of tiles having upper surfaces of different outlines, but all having their lower surfaces bounded by straight lines. In Figs. 18 and 19 these surfaces are bounded by curved lines.

In the drawings, 20 is the upper surface, 30 the lower surface and 40 the edge or butt wall of a tile embodying my invention.

Referring more particularly to Figs. 1, 4, 6, 7 and 8 it will be observed that the upper surface 20 and the lower surface 30 of each tile are substantially parallel plane surfaces. In each case also the boundary lines of the lower surface 31, 32, 33 and 34 are straight lines and the boundary lines of the upper surface 21, 22, 23 and 24 are curved lines, and each of these curved lines are composed of an inwardly curving arc $a$ and an outwardly curving arc $b$, these arcs being precisely similar and equal in length. It will also be observed that a plane perpendicular to the upper and lower surface of the tile and passing through the lines 31, 32, 33, and 34 would bisect the lines 21, 23, 23 and 24 is prolonged upward. The edges or butt walls 40 of each of these tiles are made of warped surfaces, made by sweeping an imaginary straight line $x$ $x$ in constant contact with the similarly placed boundary lines 31 and 21; 32 and 22; 33 and 23 and 34 and 24 and keeping the line $x$ $x$ always in a plane perpendicular to the plane of the upper and lower surfaces, 20 and 30, so that all transverse vertical sections of such butt wall are bounded by straight lines as seen in Figs. 6, 7 and 8. It follows then that if the upper and lower boundary lines of two adjacent tiles are identical, then the warped surfaces of their butt walls are identical. And if the upper boundary line projects both outward and inward from a vertical surface passing through the lower boundary line of the one tile, it follows that the warped surface of the adjacent tile will, when brought into contact with the similar surface of its neighbor, underlap and overlap such surface and thus form between the two tiles a vertical bond, which, in all cases, is along a straight line and for the full depth of the tile. Consequently a surface composed of these tiles may be worn down to a thin layer without unlocking the vertical bond between the adjacent tiles. Moreover, as the lines 21, 22, 23 and 24 are each identical, and the lines 31, 32, 33 and 34 are each identical, it follows that each tile will engage exactly with every side of its neighbor in the series. It will be seen also that so long as the abutting surfaces of the adjacent tiles are formed of warped surfaces of identical contour, but one the reverse of the other, then such adjacent tiles will have a perfect vertical bond provided along the junction surface, because part of it overlaps and part underlaps. Such constructions with surfaces of different outlines are shown in Figs. 2, 3, 9, 10, 11, 12, 13, 14 and 17, in each of which the boundary lines of the upper surfaces of the tiles are composed of reversed curves of identically equal arcs; and in Figs. 15 and 16, in which such curves are formed of eccentric arcs.

In Figs. 18 and 19 the lower and upper boundary lines are both curved, but the butt walls of adjacent surfaces would overlap and underlap just the same so long as the warped surface forming the butt wall falls on both sides of a vertical surface passing through the boundary line of the lower surface.

In Fig. 1 it will be observed that the smaller tile has one straight edge 400. This is for the purpose of placing the same against a surbase or flat wainscoting.

It is obvious that wide modifications may be made in the detail of my invention without departing from its essential principles. An infinite variety of patterns may be made and yet each tile may be vertically as well as horizontally bonded with its neighbor.

What I claim as new is:—

1. A tile having a butt wall formed of a warped surface which is inclined inwardly along part of its length and outwardly along another part of its length.

2. A tile having a butt wall formed of a continuous warped surface with alternating overlapping and underlapping faces inclined in opposite directions.

3. A tile having upper and lower surfaces which are substantially parallel and also having butt walls formed of warped surfaces each lying on both sides of a plane which is at right angles to the upper and lower surfaces.

4. A tile having upper and lower surfaces which are substantially parallel and also having butt walls formed of warped surfaces, each lying on both sides of a plane which is at right angles to the upper and lower surfaces and passes through the boundary lines of the lower surface.

5. A tile having a butt wall formed of a continuous warped surface with overlapping and underlapping faces, one of which has its surface inclined inwardly and the other inclined outwardly, one edge of said wall being curvilinear and the other of dissimilar shape.

6. A tile having edges of one face of angular conformation and edges of its other face of compound curve conformation and butt walls alternately inclined in opposite directions from one toward the other face of the tile.

7. A tile having upper and lower surfaces, one bounded by curved and the other by straight lines, and the side walls of which consist of warped surfaces made by sweeping a straight line along both of said boundary lines in constant contact therewith.

8. A tile having upper and lower surfaces, one bounded by curved and the other by straight lines, and the side walls of which consist of warped surfaces made by sweeping a straight line along both of said boundary lines in constant contact therewith and which straight line is at all times in a plane perpendicular to the upper and lower surfaces.

9. A tile having an upper and a lower surface one of which is bounded by compound curves and the other of which is bounded by straight lines, said tile also having butt walls which extend from the straight lines to the compound curves by continuous changes in direction.

10. A tile having butt walls composed of curved surfaces and bounded on one face of the tile by straight lines meeting at an angle, said butt walls at a corner of the tile being formed with faces which are inclined with respect to vertical planes passing through the lines of the edges of one face thereof.

11. A tile having an outer and an inner surface and a butt wall formed with a plurality of bonding elements which are curvilinear and each provided with an inclined face, the inclination of one of said faces being continuous in one direction approximately from one to the other of said surfaces and the inclination of the other of said faces being continuous in the opposite direction approximately from one to the other of said surfaces.

12. A tile having a butt wall formed of alternating convex and concave portions each having its face continuously inclined approximately from one to the other surface of the tile, the direction of inclination of one of said faces being opposite that of the other.

13. A tile having a butt wall formed of a warp surface inclined inwardly along part of its length and outwardly along another part of its length in combination with a second tile having a butt wall formed of a warped surface inclined in exactly the opposite direction at each point to the wall of the first tile.

In testimony whereof I affix my signature in presence of two witnesses.

JOHN H. PUGH.

Witnesses:
 MAY HUGHES,
 ALAN MCDONNELL.